US008423654B2

(12) United States Patent
Wookey et al.

(10) Patent No.: US 8,423,654 B2
(45) Date of Patent: Apr. 16, 2013

(54) METHODS AND SYSTEMS FOR PREVENTING A LOCAL DISPLAY DEVICE FROM DISPLAYING DATA GENERATED BY A REMOTE COMPUTING DEVICE (75) Inventors: Michael Wookey, Epping (AU); Scott Mooney, Pompano Beach, FL (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 686 days.

(21) Appl. No.: 12/614,931

(22) Filed: Nov. 9, 2009

(65) Prior Publication Data
US 2010/0274903 A1 Oct. 28, 2010

Related U.S. Application Data (60) Provisional application No. 61/172,405, filed on Apr. 24, 2009.

(51) Int. Cl.
G06F 15/16 (2006.01)
(52) U.S. Cl.
USPC ........................................... 709/228; 709/208
(58) Field of Classification Search .................. 709/208, 709/228
See application file for complete search history.

(56) References Cited

U.S. PATENT DOCUMENTS

| 6,760,017 B1 | 7/2004 | Banerjee et al. |
| 6,982,682 B1 * | 1/2006 | Kaulgud et al. ............... 345/1.1 |
| 7,043,697 B1 * | 5/2006 | Jensen et al. .................. 715/788 |
| 7,633,483 B2 * | 12/2009 | Ben-Schachar et al. ....... 345/1.1 |
| 2003/0084169 A1 * | 5/2003 | Zhu et al. ....................... 709/229 |
| 2003/0189599 A1 * | 10/2003 | Ben-Shachar et al. ........ 345/790 |
| 2006/0248581 A1 * | 11/2006 | Sundarrajan et al. ........... 726/12 |
| 2007/0296643 A1 * | 12/2007 | Ben-Shachar et al. ......... 345/1.1 |
| 2008/0082187 A1 | 4/2008 | Winterstein et al. |

OTHER PUBLICATIONS

International Preliminary Report on Patentability on PCT/US2009/063711 dated Nov. 3, 2011.
International Search Report on PCT/US2009/063711 dated Apr. 7, 2010.
Written Opinion on PCT/US2009/063711 dated Apr. 7, 2010.

* cited by examiner

*Primary Examiner* — Patrice Winder
(74) *Attorney, Agent, or Firm* — Foley & Lardner LLP; John D. Lanza (57) ABSTRACT A method and system for preventing a local display device from displaying data generated by a remote computing device is described. The system includes a local agent for facilitating a remote session; an operating system generating a request to enable a display device controlled by a display adapter; and a filter executing in a driver and in communication with the local agent, the filter intercepting the request generated by the operating system. The filter transmits the request to the local agent when a remote user is active or to the display adapter when the remote user is inactive. The filter will transmits a signal to the operating system that the display adapter has enabled the display device when the filter transmits the request to at least one of the local agent and the display adapter.

20 Claims, 5 Drawing Sheets

METHODS AND SYSTEMS FOR PREVENTING A LOCAL DISPLAY DEVICE FROM DISPLAYING DATA GENERATED BY A REMOTE COMPUTING DEVICE

CROSS-REFERENCE TO PROVISIONAL APPLICATION

This application claims priority to U.S. Provisional Application No. 61/172,405 filed on Apr. 24, 2009, the entire content of which is incorporated by reference herein.

FIELD OF THE INVENTION

The present disclosure relates to methods and systems for managing a display of data. In particular, the present disclosure relates to methods and systems for preventing a local display device from displaying data generated by a remote computing device.

BACKGROUND OF THE INVENTION

Remoting the desktops of ordinary workstations includes enabling a user to operate a first computing device from a second computing device over the Internet. Examples include remote control software services, such as GoToMyPC produced by Citrix System Inc. Remoting desktops present various problems related to security and information disclosure. In some cases there are certain limitations, which require "screen scraping" of the workstation desktop.

In other cases, the workstation desktop must be enabled and visible so that certain technologies function correctly. For example, GoToMyPC must work with an enabled display. However, one problem with the workstation display being enabled is that anyone local to the workstation can view what the remote user is doing by simply looking at the local display screen.

There have been various attempts to provide a solution to this issue. For example, in some conventional systems, a full-screen overlay is used to hide the contents of the local workstation desktop when the desktop is being remoted. However, there are limitations with screen overlays. For example, screen overlays can only be used with one application at a time. In particular, some media player applications (e.g. DVD players), generate full-screen overlays displaying data and do not typically permit a second overlay to be displayed above the generated full-screen overlay. Thus, if a DVD player or other media player has already created an overlay then a new overlay cannot be created, leaving the local display visible. GoToMyPC, for example, warns the remote user if it is unable to blank the local monitor because the overlay creating has failed.

A full-screen overlay is also inadequate when the local workstation has a plurality display devices (e.g. monitors). An overlay can only be created on one of the plurality of monitors, leaving the rest of the monitors exposed.

In other systems, when a local user presses a combination of keys, such as, Ctl-Alt-Del to activate the local desktop, the overlay will disappear, allowing display of the remote data. In addition, although many remote control software services prevent local input when a remote user is attached to the local computing device (i.e. the local user is unable to interact with the local computing device), a local user can observe everything that the remote user is doing via the local display. Moreover, most remote control software services will not re-establish the overlay, leaving the local computing device vulnerable to anyone wishing to view the desktop.

Thus, conventional systems for disabling local workstation displays do not provide reliable functionality for blocking the display of data generated remotely. Nor do such conventional systems provide for preventing typical overlays from interfering with the execution of authorized applications on the machine.

SUMMARY OF THE INVENTION

The present disclosure is directed to a method and system for preventing a local display device from displaying data generated by a remote computing device. In one embodiment, the disclosure relates to power management for powering up and down the locally attached monitors when a remote user is connected to a local computing device. Many operating systems include a component responsible for sending a message to the display adapter infrastructure to power up when an input device (e.g. a mouse or a keyboard) is present. In the presently disclosed system, the message that indicates that the local display should power up are filtered for preventing the request from being relayed to the local display adapter when a remote user is currently active. Once the remote user has disconnected, the filter sends another message to the local display indicating that it can power up again. The local user is therefore prevented from observing what the remote user is doing on the local desktop. Even attempting to plug in a new monitor will still fail since the display adapter has been told not to power on.

Therefore, the presently described system and method allow for secure local desktops, including those with multiple monitors, whenever one or more desktop remoting technologies is active. In one particular embodiment of the presently disclosed system and method, the display of a local computing device is blanked when a remote computing device generates data associated with data generated by the local computing device. Moreover, the present system and method allows for the use of secure screen blanking in conjunction with graphically intense application.

In one embodiment, a computing device is described. The computing device includes a local agent connected to a remote agent for facilitating a remote session with a remote user; an operating system generating a request to enable a display device controlled by a display adapter; and a filter executing in a driver and in communication with the local agent, the filter intercepting the request generated by the operating system. The filter will transmit the request to the local agent when a remote user is active, and to the display adapter when said remote user is inactive. The filter will then transmit a signal to the operating system that the display adapter has enabled the display device when the filter transmits the request to at least one of the local agent and the display adapter. In one embodiment, the filter transmits the request to the display adapter when the remote session is ended. In another embodiment, the filter transmits the request to the display adapter when the remote user is inactive. In yet another embodiment, the filter transmits the request to the display adapter when no remote session is facilitated. In one particular embodiment, the local agent activates the filter when a remote session is facilitated.

A method of filtering a request to display data generated by a remote computing device is also described. The method includes receiving, by a filter executing in a driver, a signal indicating that a remote session has been established with a remote computing device for interacting with data generated by a local computing device; generating, by an operating system executing in the local computing device, a request to enable at least one local display device controlled by a display adapter; intercepting, by the filter, the request generated by the operating system; blocking, by the driver, the request when an a remote user is active; and transmitting, by the filter, to the operating system a signal indicating that the display adapter has enabled the display device. The method further includes transmitting, by the filter, the request to enable the at least one local display device to the display adapter when the remote user is inactive. In another embodiment, the method further includes transmitting, by the filter, the request to enable the at least one local display device to the display adapter when the remote session terminates. In one particular embodiment, the step of receiving includes activating, by a local agent executing in the local computing device and associated with the remote computing device, the filter when the remote session is established, where the local agent facilitates the remote session. In yet another embodiment, the filter transmits the request to enable the at least one display device to the local agent when the remote user active. The driver is a locally executed driver associated with the operating system and the display adapter. In one embodiment, the request to enable is adapted for instructing the display adapter to power up the at least one display device. In another embodiment, the request to enable is generated by at least one input device of the local computing device.

A method for preventing a local computing device from displaying data generated by a remote computing device is also described. The method includes receiving, by the driver, a signal that a remote session has been established with the local computing device; intercepting, by a driver executing in a local computing device, a request generated by an operating system to enable at least one display device associated with the local computing device; transmitting, by the driver, the request generated by the operating system to a local agent, when a remote user is active; and transmitting, by the driver, the request generated by the operating system to a display adapter when a remote user is inactive, where the display adapter is adapted activating the at least one display device. The method further includes transmitting, by the driver, to the operating system a signal indicating that the display adapter has enabled the at least one display device. In addition, the method further includes activating, by said local agent, a filter executing in the driver for detecting the remote user. In one particular embodiment, the method further includes intercepting, by the driver, a power request to the display adapter instructing said display adapter to power up the at least one display device, said power request generated by the operating system; and preventing, by the driver, the power request from reaching the display adapter when a remote user interacts with the local computing device. In this particular embodiment, the power request is generated by at least one input device.

The method further includes intercepting, by a second driver, a request from an application executing on the computing device, addressed to the display adapter, for a status of the display device; determining, by the second driver, that the display device is disabled and that the remote user is interacting with a remote display of the locally generated data; and transmitting, by the second driver, to the application, a response to the intercepted request indicating that the display device is enabled. Moreover, the method further includes intercepting, by the driver, a power request to the display adapter instructing said display adapter to power up the at least one display device, said power request generated by the operating system; and preventing, by the driver, the power request from reaching the display adapter when a remote user interacts with the local computing device.

Other features of the presently disclosed methods and systems for preventing a local display device from displaying data generated by a remote computing device will become apparent from the following detailed description taken in conjunction with the accompanying drawing, which illustrate, by way of example, the presently disclosed method and system.

BRIEF DESCRIPTION OF THE DRAWINGS

The foregoing and other objects, aspects, features, and advantages of the disclosure will become more apparent and better understood by referring to the following description taken in conjunction with the accompanying drawings, in which.

DETAILED DESCRIPTION

Figure 1A:
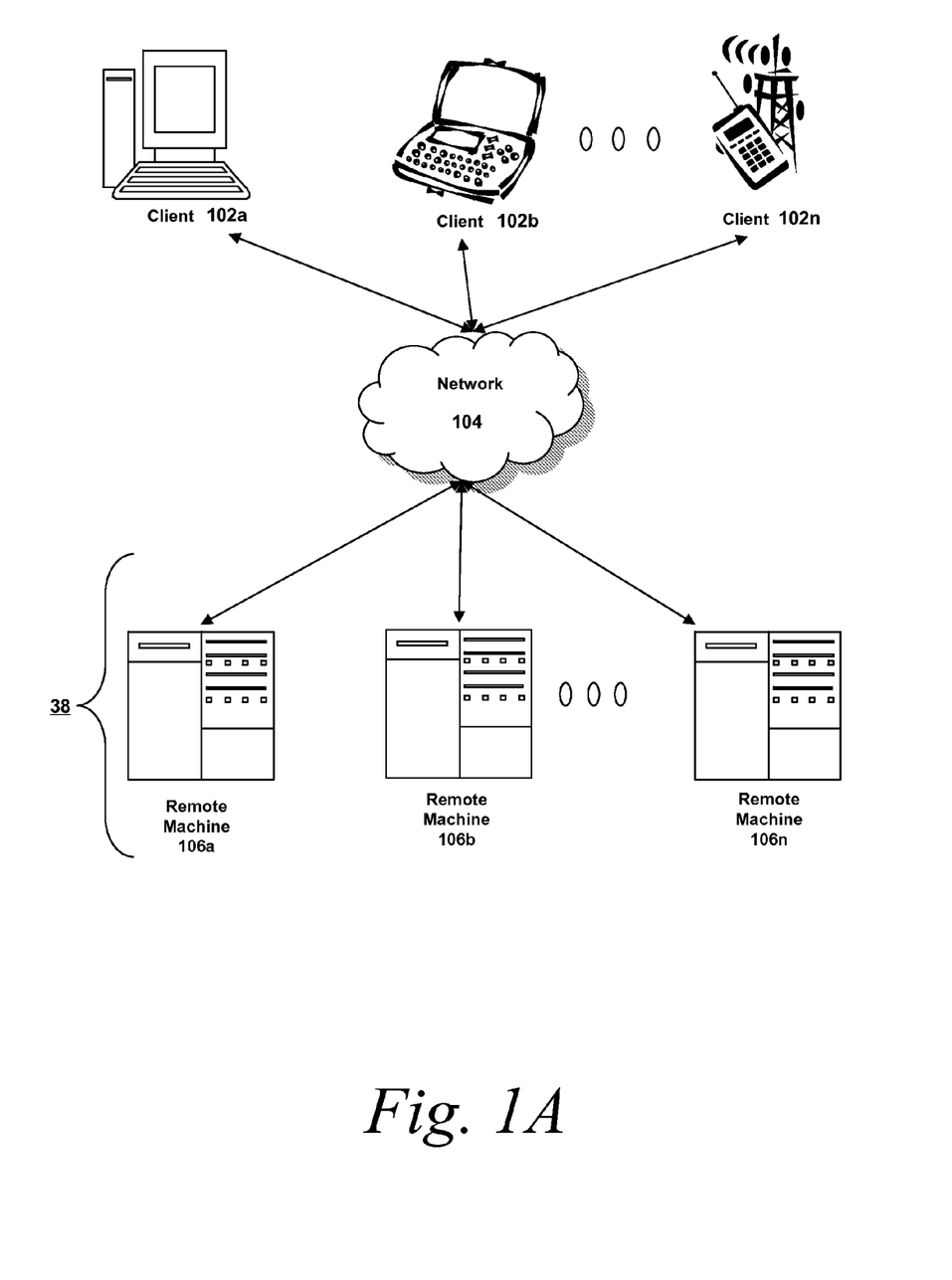
FIG. 1A is a block diagram depicting an embodiment of a network environment comprising client machines in communication with remote machines.

Referring now to FIG. 1A, an embodiment of a network environment is depicted. In brief overview, the network environment comprises one or more clients 102a-102n (also generally referred to as local machine(s) 102, client(s) 102, client node(s) 102, client machine(s) 102, client computer(s) 102, client device(s) 102, endpoint(s) 102, or endpoint node(s) 102) in communication with one or more servers 106a-106n (also generally referred to as server(s) 106 or remote machine(s) 106) via one or more networks 104. In some embodiments, a client 102 has the capacity to function as both a client node seeking access to resources provided by a server and as a server providing access to hosted resources for other clients 102a-102n.

Although FIG. 1A shows a network 104 between the clients 102 and the servers 106, the clients 102 and the servers 106 may be on the same network 104. The network 104 can be a local-area network (LAN), such as a company Intranet, a metropolitan area network (MAN), or a wide area network (WAN), such as the Internet or the World Wide Web. In some embodiments, there are multiple networks 104 between the clients 102 and the servers 106. In one of these embodiments, a network 104' (not shown) may be a private network and a network 104 may be a public network. In another of these embodiments, a network 104 may be a private network and a network 104' a public network. In still another embodiment, networks 104 and 104' may both be private networks.

The network 104 may be any type and/or form of network and may include any of the following: a point to point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. In some embodiments, the network 104 may comprise a wireless link, such as an infrared channel or satellite band. The topology of the network 104 may be a bus, star, or ring network topology. The network 104 may be of any such network topology as known to those ordinarily skilled in the art capable of supporting the operations described herein. The network may comprise mobile telephone networks utilizing any protocol or protocols used to communicate among mobile devices, including AMPS, TDMA, CDMA, GSM, GPRS or UMTS. In some embodiments, different types of data may be transmitted via different protocols. In other embodiments, the same types of data may be transmitted via different protocols.

In some embodiments, the system may include multiple, logically grouped servers 106. In one of these embodiments, the logical group of servers may be referred to as a server farm 38. In another of these embodiments, the servers 106 may be geographically dispersed. In other embodiments, a server farm 38 may be administered as a single entity. In still other embodiments, the server farm 38 comprises a plurality of server farms 38. The servers 106 within each server farm 38 can be heterogeneous—one or more of the servers 106 can operate according to one type of operating system platform (e.g., WINDOWS NT, manufactured by Microsoft Corp. of Redmond, Wash.), while one or more of the other servers 106 can operate on according to another type of operating system platform (e.g., Unix or Linux).

The servers 106 of each server farm 38 do not need to be physically proximate to another server 106 in the same server farm 38. Thus, the group of servers 106 logically grouped as a server farm 38 may be interconnected using a wide-area network (WAN) connection or a metropolitan-area network (MAN) connection. For example, a server farm 38 may include servers 106 physically located in different continents or different regions of a continent, country, state, city, campus, or room. Data transmission speeds between servers 106 in the server farm 38 can be increased if the servers 106 are connected using a local-area network (LAN) connection or some form of direct connection.

Server 106 may be a file server, application server, web server, proxy server, appliance, network appliance, gateway, application gateway, gateway server, virtualization server, deployment server, SSL VPN server, or firewall. In some embodiments, a server 106 provides a remote authentication dial-in user service, and is referred to as a RADIUS server. In other embodiments, a server 106 may have the capacity to function as either an application server or as a master application server. In still other embodiments, a server 106 is a blade server. In yet other embodiments, a server 106 executes a virtual machine providing, to a user or client computer 102, access to a computing environment.

In one embodiment, a server 106 may include an Active Directory. The server 106 may be an application acceleration appliance. For embodiments in which the server 106 is an application acceleration appliance, the server 106 may provide functionality including firewall functionality, application firewall functionality, or load balancing functionality. In some embodiments, the server 106 comprises an appliance such as one of the line of appliances manufactured by the Citrix Application Networking Group, of San Jose, Calif., or Silver Peak Systems, Inc., of Mountain View, Calif., or of Riverbed Technology, Inc., of San Francisco, Calif., or of F5 Networks, Inc., of Seattle, Wash., or of Juniper Networks, Inc., of Sunnyvale, Calif.

In some embodiments, a server 106 executes an application on behalf of a user of a client 102. In other embodiments, a server 106 executes a virtual machine, which provides an execution session within which applications execute on behalf of a user or a client 102. In one of these embodiments, the execution session is a hosted desktop session. In another of these embodiments, the execution session provides access to a computing environment, which may comprise one or more of: an application, a plurality of applications, a desktop application, and a desktop session in which one or more applications may execute.

In some embodiments, a client 102 communicates with a server 106. In one embodiment, the client 102 communicates directly with one of the servers 106 in a server farm 38. In another embodiment, the client 102 executes a program neighborhood application to communicate with a server 106 in a server farm 38. In still another embodiment, the server 106 provides the functionality of a master node. In some embodiments, the client 102 communicates with the server 106 in the server farm 38 through a network 104. Over the network 104, the client 102 can, for example, request execution of various applications hosted by the servers 106*a*-106*n* in the server farm 38 and receive output of the results of the application execution for display. In some embodiments, only the master node provides the functionality required to identify and provide address information associated with a server 106*b* hosting a requested application.

In one embodiment, the server 106 provides the functionality of a web server. In another embodiment, the server 106*a* receives requests from the client 102, forwards the requests to a second server 106*b* and responds to the request by the client 102 with a response to the request from the server 106*b*. In still another embodiment, the server 106 acquires an enumeration of applications available to the client 102 and address information associated with a server 106' hosting an application identified by the enumeration of applications. In yet another embodiment, the server 106 presents the response to the request to the client 102 using a web interface. In one embodiment, the client 102 communicates directly with the server 106 to access the identified application. In another embodiment, the client 102 receives output data, such as display data, generated by an execution of the identified application on the server 106.

In some embodiments, the server 106 or a server farm 38 may be running one or more applications, such as an application providing a thin-client computing or remote display presentation application. In one embodiment, the server 106 or server farm 38 executes as an application any portion of the CITRIX ACCESS SUITE by Citrix Systems, Inc., such as the METAFRAME or CITRIX PRESENTATION SERVER and/or any of the MICROSOFT WINDOWS Terminal Services manufactured by the Microsoft Corporation. In another embodiment, the application is an ICA client, developed by Citrix Systems, Inc. of Fort Lauderdale, Fla. In still another embodiment, the server 106 may run an application, which, for example, may be an application server providing email services such as MICROSOFT EXCHANGE manufactured by the Microsoft Corporation of Redmond, Wash., a web or Internet server, or a desktop sharing server, or a collaboration server. In yet another embodiment, any of the applications may comprise any type of hosted service or products, such as GOTOMEETING provided by Citrix Online Division, Inc. of Santa Barbara, Calif., WEBEX provided by WebEx, Inc. of Santa Clara, Calif., or Microsoft Office LIVE MEETING provided by Microsoft Corporation of Redmond, Wash.

A client 102 may execute, operate or otherwise provide an application, which can be any type and/or form of software, program, or executable instructions such as any type and/or form of web browser, web-based client, client-server application, a thin-client computing client, an ActiveX control, or a Java applet, or any other type and/or form of executable instructions capable of executing on client 102. In some embodiments, the application may be a server-based or a remote-based application executed on behalf of the client 102 on a server 106. In one embodiments the server 106 may display output to the client 102 using any thin-client or remote-display protocol, such as the Independent Computing Architecture (ICA) protocol manufactured by Citrix Systems, Inc. of Ft. Lauderdale, Fla. or the Remote Desktop Protocol (RDP) manufactured by the Microsoft Corporation of Redmond, Wash. The application can use any type of protocol and it can be, for example, an HTTP client, an FTP client, an Oscar client, or a Telnet client. In other embodiments, the application comprises any type of software related to voice over internet protocol (VoIP) communications, such as a soft IP telephone. In further embodiments, the application comprises any application related to real-time data communications, such as applications for streaming video and/or audio.

Figure 1B:
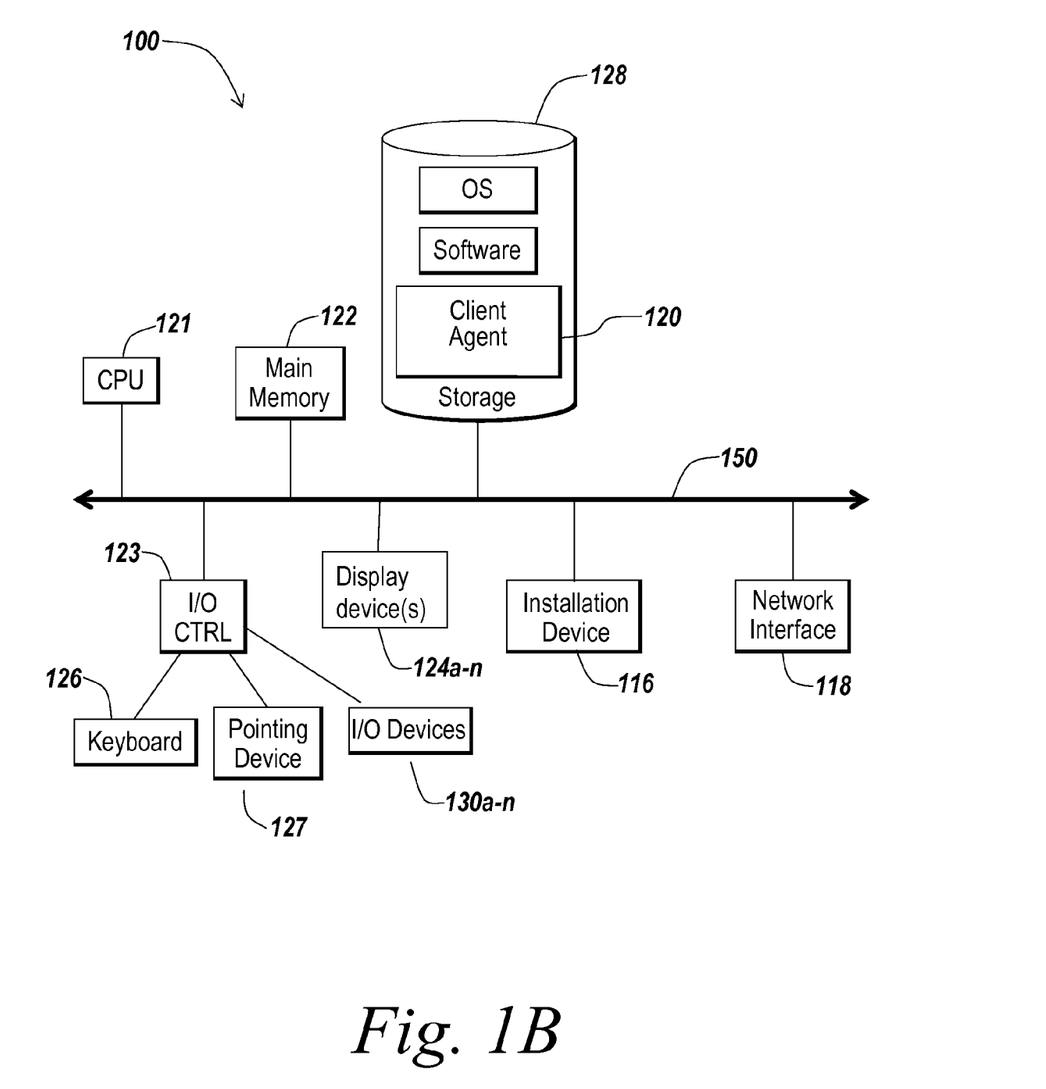
FIGS. 1B and 1C are block diagrams depicting embodiments of computers useful in connection with the methods and systems described herein.
Figure 1C:
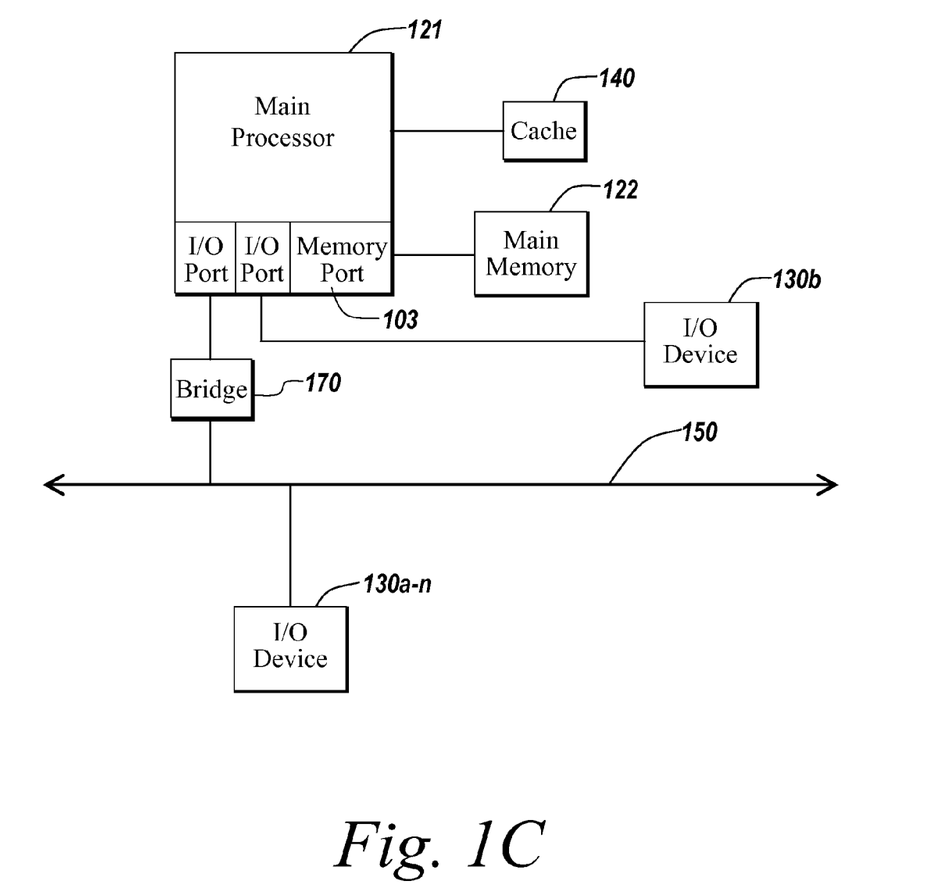

The client 102 and server 106 may be deployed as and/or executed on any type and form of computing device, such as a computer, network device or appliance capable of communicating on any type and form of network and performing the operations described herein. FIGS. 1B and 1C depict block diagrams of a computing device 100 useful for practicing an embodiment of the client 102 or a server 106. As shown in FIGS. 1B and 1C, each computing device 100 includes a central processing unit 121, and a main memory unit 122. As shown in FIG. 1B, a computing device 100 may include a storage device 128, an installation device 116, a network interface 118, an I/O controller 123, display devices 124a-n, a keyboard 126 and a pointing device 127, such as a mouse. The storage device 128 may include, without limitation, an operating system, software, and a client agent 120. As shown in FIG. 1C, each computing device 100 may also include additional optional elements, such as a memory port 103, a bridge 170, one or more input/output devices 130a-130n (generally referred to using reference numeral 130), and a cache memory 140 in communication with the central processing unit 121.

The central processing unit 121 is any logic circuitry that responds to and processes instructions fetched from the main memory unit 122. In many embodiments, the central processing unit 121 is provided by a microprocessor unit, such as: those manufactured by Intel Corporation of Mountain View, Calif.; those manufactured by Motorola Corporation of Schaumburg, Ill.; those manufactured by Transmeta Corporation of Santa Clara, Calif.; the RS/6000 processor, those manufactured by International Business Machines of White Plains, N.Y.; or those manufactured by Advanced Micro Devices of Sunnyvale, Calif. The computing device 100 may be based on any of these processors, or any other processor capable of operating as described herein.

Main memory unit 122 may be one or more memory chips capable of storing data and allowing any storage location to be directly accessed by the microprocessor 121, such as Static random access memory (SRAM), Burst SRAM or Synch-Burst SRAM (BSRAM), Dynamic random access memory (DRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Enhanced DRAM (EDRAM), synchronous DRAM (SDRAM), JEDEC SRAM, PC100 SDRAM, Double Data Rate SDRAM (DDR SDRAM), Enhanced SDRAM (ESDRAM), SyncLink DRAM (SLDRAM), Direct Rambus DRAM (DRDRAM), or Ferroelectric RAM (FRAM). The main memory 122 may be based on any of the above described memory chips, or any other available memory chips capable of operating as described herein. In the embodiment shown in FIG. 1B, the processor 121 communicates with main memory 122 via a system bus 150 (described in more detail below). FIG. 1C depicts an embodiment of a computing device 100 in which the processor communicates directly with main memory 122 via a memory port 103. For example, in FIG. 1C the main memory 122 may be DRDRAM.

FIG. 1C depicts an embodiment in which the main processor 121 communicates directly with cache memory 140 via a secondary bus, sometimes referred to as a backside bus. In other embodiments, the main processor 121 communicates with cache memory 140 using the system bus 150. Cache memory 140 typically has a faster response time than main memory 122 and is typically provided by SRAM, BSRAM, or EDRAM. In the embodiment shown in FIG. 1C, the processor 121 communicates with various I/O devices 130 via a local system bus 150. Various buses may be used to connect the central processing unit 121 to any of the I/O devices 130, including a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 124, the processor 121 may use an Advanced Graphics Port (AGP) to communicate with the display 124. FIG. 1C depicts an embodiment of a computer 100 in which the main processor 121 communicates directly with I/O device 130b via HYPERTRANSPORT, RAPIDIO, or INFINIBAND communications technology. FIG. 1C also depicts an embodiment in which local busses and direct communication are mixed: the processor 121 communicates with I/O device 130a using a local interconnect bus while communicating with I/O device 130b directly.

A wide variety of I/O devices 130a-130n may be present in the computing device 100. Input devices include keyboards, mice, trackpads, trackballs, microphones, and drawing tablets. Output devices include video displays, speakers, inkjet printers, laser printers, and dye-sublimation printers. The I/O devices may be controlled by an I/O controller 123 as shown in FIG. 1B. The I/O controller may control one or more I/O devices such as a keyboard 126 and a pointing device 127, e.g., a mouse or optical pen. Furthermore, an I/O device may also provide storage and/or an installation medium 116 for the computing device 100. In still other embodiments, the computing device 100 may provide USB connections (not shown) to receive handheld USB storage devices such as the USB Flash Drive line of devices manufactured by Twintech Industry, Inc. of Los Alamitos, Calif.

Referring again to FIG. 1B, the computing device 100 may support any suitable installation device 116, such as a floppy disk drive for receiving floppy disks such as 3.5-inch, 5.25-inch disks or ZIP disks, a CD-ROM drive, a CD-R/RW drive, a DVD-ROM drive, tape drives of various formats, USB device, hard-drive or any other device suitable for installing software and programs. The computing device 100 may further comprise a storage device, such as one or more hard disk drives or redundant arrays of independent disks, for storing an operating system and other related software, and for storing application software programs such as any program related to the client agent 120. Optionally, any of the installation devices 116 could also be used as the storage device. Additionally, the operating system and the software can be run from a bootable medium, for example, a bootable CD, such as KNOPPIX, a bootable CD for GNU/Linux that is available as a GNU/Linux distribution from knoppix.net.

Furthermore, the computing device 100 may include a network interface 118 to interface to the network 104 through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections can be established using a variety of communication protocols (e.g., TCP/IP, IPX, SPX, NetBIOS, Ethernet, ARCNET, SONET, SDH, Fiber Distributed Data Interface (FDDI), RS232, IEEE 802.11, IEEE 802.11a, IEEE 802.11b, IEEE 802.11g, CDMA, GSM, WiMax and direct asynchronous connections). In one embodiment, the computing device 100 communicates with other computing devices 100' via any type and/or form of gateway or tunneling protocol such as Secure Socket Layer (SSL) or Transport Layer Security (TLS), or the Citrix Gateway Protocol manufactured by Citrix Systems, Inc. of Ft. Lauderdale, Fla. The network interface 118 may comprise a built-in network adapter, network interface card, PCMCIA network card, card bus network adapter, wireless network adapter, USB network adapter, modem or any other device suitable for interfacing the computing device 100 to any type of network capable of communication and performing the operations described herein.

In some embodiments, the computing device 100 may comprise or be connected to multiple display devices 124a-124n, which each may be of the same or different type and/or form. As such, any of the I/O devices 130a-130n and/or the I/O controller 123 may comprise any type and/or form of suitable hardware, software, or combination of hardware and software to support, enable or provide for the connection and use of multiple display devices 124a-124n by the computing device 100. For example, the computing device 100 may include any type and/or form of video adapter, video card, driver, and/or library to interface, communicate, connect or otherwise use the display devices 124a-124n. In one embodiment, a video adapter may comprise multiple connectors to interface to multiple display devices 124a-124n. In other embodiments, the computing device 100 may include multiple video adapters, with each video adapter connected to one or more of the display devices 124a-124n. In some embodiments, any portion of the operating system of the computing device 100 may be configured for using multiple displays 124a-124n. In other embodiments, one or more of the display devices 124a-124n may be provided by one or more other computing devices, such as computing devices 100a and 100b connected to the computing device 100, for example, via a network. These embodiments may include any type of software designed and constructed to use another computer's display device as a second display device 124a for the computing device 100. One ordinarily skilled in the art will recognize and appreciate the various ways and embodiments that a computing device 100 may be configured to have multiple display devices 124a-124n.

In further embodiments, an I/O device 130 may be a bridge between the system bus 150 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a HIPPI bus, a Super HIPPI bus, a SerialPlus bus, a SCI/LAMP bus, a FibreChannel bus, or a Serial Attached small computer system interface bus.

A computing device 100 of the sort depicted in FIGS. 1B and 1C typically operates under the control of operating systems, which control scheduling of tasks and access to system resources. The computing device 100 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: WINDOWS 3.x, WINDOWS 95, WINDOWS 98, WINDOWS 2000, WINDOWS NT 3.51, WINDOWS NT 4.0, WINDOWS CE, WINDOWS XP, and WINDOWS VISTA, all of which are manufactured by Microsoft Corporation of Redmond, Wash.; MAC OS, manufactured by Apple Computer of Cupertino, Calif.; OS/2, manufactured by International Business Machines of Armonk, N.Y.; and Linux, a freely-available operating system distributed by Caldera Corp. of Salt Lake City, Utah, or any type and/or form of a Unix operating system, among others.

The computer system 100 can be any workstation, desktop computer, laptop or notebook computer, server, handheld computer, mobile telephone or other portable telecommunication device, media playing device, a gaming system, mobile computing device, or any other type and/or form of computing, telecommunications or media device that is capable of communication and that has sufficient processor power and memory capacity to perform the operations described herein. For example, the computer system 100 may comprise a device of the IPOD family of devices manufactured by Apple Computer of Cupertino, Calif., a PLAYSTATION 2, PLAYSTATION 3, or PERSONAL PLAYSTATION PORTABLE (PSP) device manufactured by the Sony Corporation of Tokyo, Japan, a NINTENDO DS, NINTENDO GAMEBOY, NINTENDO GAMEBOY ADVANCED or NINTENDO REVOLUTION device manufactured by Nintendo Co., Ltd., of Kyoto, Japan, or an XBOX or XBOX 360 device manufactured by the Microsoft Corporation of Redmond, Wash.

In some embodiments, the computing device 100 may have different processors, operating systems, and input devices consistent with the device. For example, in one embodiment, the computing device 100 is a TREO 180, 270, 600, 650, 680, 700p, 700w/wx, 750, 755p, 800w, Centro, or Pro smart phone manufactured by Palm, Inc. In some of these embodiments, the TREO smart phone is operated under the control of the PalmOS operating system and includes a stylus input device as well as a five-way navigator device.

In other embodiments the computing device 100 is a mobile device, such as a JAVA-enabled cellular telephone or personal digital assistant (PDA), such as the i55sr, i58sr, i85s, i88s, i90c, i95c1, i335, i365, i570, 1576, i580, i615, i760, i836, i850, i870, i880, i920, i930, ic502, ic602, ic902, i776 or the im1100, all of which are manufactured by Motorola Corp. of Schaumburg, Ill., the 6035 or the 7135, manufactured by Kyocera of Kyoto, Japan, or the i300 or i330, manufactured by Samsung Electronics Co., Ltd., of Seoul, Korea. In some embodiments, the computing device 100 is a mobile device manufactured by Nokia of Finland, or by Sony Ericsson Mobile Communications AB of Lund, Sweden.

In still other embodiments, the computing device 100 is a Blackberry handheld or smart phone, such as the devices manufactured by Research In Motion Limited, including the Blackberry 7100 series, 8700 series, 7700 series, 7200 series, the Blackberry 7520, the Blackberry PEARL 8100, the 8700 series, the 8800 series, the Blackberry Storm, Blackberry Bold, Blackberry Curve 8900, and the Blackberry Pearl Flip. In yet other embodiments, the computing device 100 is a smart phone, Pocket PC, Pocket PC Phone, or other handheld mobile device supporting Microsoft Windows Mobile Software. Moreover, the computing device 100 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

In some embodiments, the computing device 100 is a digital audio player. In one of these embodiments, the computing device 100 is a digital audio player such as the Apple IPOD, IPOD Touch, IPOD NANO, and IPOD SHUFFLE lines of devices, manufactured by Apple Computer of Cupertino, Calif. In another of these embodiments, the digital audio player may function as both a portable media player and as a mass storage device. In other embodiments, the computing device 100 is a digital audio player such as the DigitalAudioPlayer Select MP3 players, manufactured by Samsung Electronics America, of Ridgefield Park, N.J., or the Motorola m500 or m25 Digital Audio Players, manufactured by Motorola Inc. of Schaumburg, Ill. In still other embodiments, the computing device 100 is a portable media player, such as the Zen Vision W, the Zen Vision series, the Zen Portable Media Center devices, or the Digital MP3 line of MP3 players, manufactured by Creative Technologies Ltd. In yet other embodiments, the computing device 100 is a portable media player or digital audio player supporting file formats including, but not limited to, MP3, WAV, M4A/AAC, WMA Protected AAC, RIFF, Audible audiobook, Apple Lossless audio file formats and .mov, .m4v, and .mp4 MPEG-4 (H.264/MPEG-4 AVC) video file formats.

In some embodiments, the computing device 100 comprises a combination of devices, such as a mobile phone combined with a digital audio player or portable media player. In one of these embodiments, the computing device 100 is a Motorola RAZR or Motorola ROKR line of combination digital audio players and mobile phones. In another of these embodiments, the computing device 100 is an iPhone smartphone, manufactured by Apple Computer of Cupertino, Calif.

Figure 2:
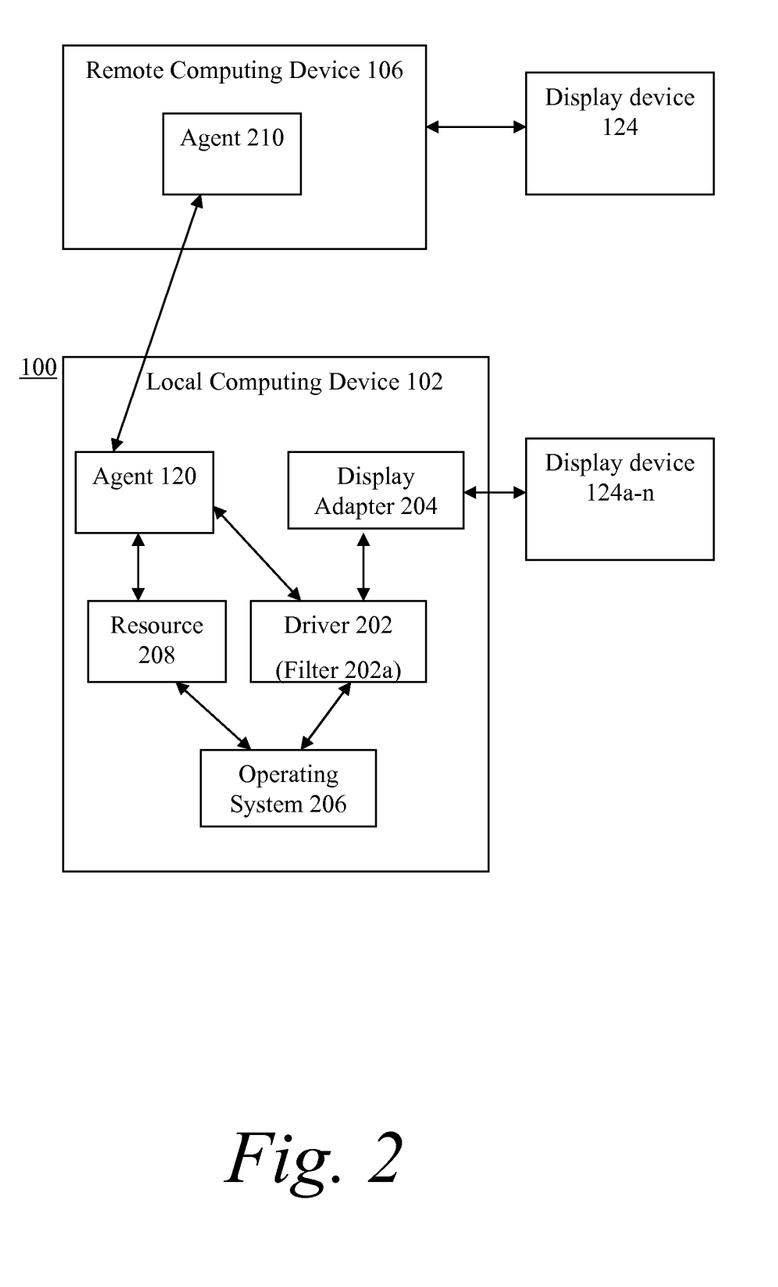
FIG. 2 is a block diagram depicting one embodiment of a system for preventing a local display device from displaying data generated by a remote computing device according to one embodiment of the presently described system.

Referring now to FIG. 2, a block diagram illustrates one embodiment of a system 100 for preventing a local display device from displaying data generated by a remote user during a remote session. In brief overview, system 100 includes a local computing device 102 communicating with a remote computing device in a network environment, as described hereinabove. The local computing device 106 includes an agent 120 communicating with an agent 210 of remote computing device 106 for facilitating a remote session. The computing device 106 further includes an operating system 206 executing in local computing device 106 and associated with a plurality of resources 208. A driver 202 is connected to the operating system 206, the local agent 120 and to a display adapter 204. The display adapter is connected at least one display device 124a-n. In accordance with the present disclosure, the driver 202 executes on the computing device 106 and intercepts a request, generated by the operating system 206, to enable the at least one display device 124a-n associated with the computing device 106. The driver 202 receives an indication that a remote user is interacting with locally generated data. Accordingly, the driver 202 determines not to transmit the intercepted request to the display adapter 204 thus providing for a more secure remoting.

Referring to FIG. 2, and in greater detail, driver 202 is an executable local driver that may be dynamically loaded. In accordance with an embodiment of the present disclosure, the driver 202 is a filter 202a for intercepting requests to power on or off the at least one display device 124a-n, where the requests are generated by operating system 206. In one particular embodiment, the power one or off request is generated by an input device, such as a mouse or a keyboard.

In another embodiment, the driver 202 is a file system filter driver or a mini-driver. The driver 202 can also be a user mode hooking mechanism. In some embodiments, the driver 202 refers to a hooking mechanism that accesses one or more software libraries to perform the functionality described herein. The driver can also be a kernel mode hooking mechanism, such as a kernel mode driver.

In some embodiments, driver 202 includes a plurality of drivers. In these embodiments, a first driver 202b may be provided to intercept requests from the operating system 206, and a second driver 202c may be provided to intercept requests originated by the resource 208. In another of these embodiments, the first driver 202b executes in kernel mode and the second driver 202c executes in user mode. Alternatively, first driver 202b executes in user mode and the second driver 202c executes in kernel mode. In another of these embodiments, first and second driver 202b, 202c each execute in kernel mode. Alternatively, first and second driver 202b, 202c each execute in user mode. In another embodiments, driver 202 includes functionality for intercepting requests from either operating system 206 or the resource 208.

Operating system 206 includes a component, such as a kernel mode component, responsible for transmitting an instruction to the display adapter 204 to power on at least one of the display device 124a-n. In one particular embodiment, the component is part of a MICROSOFT WINDOWS operating system and may execute as part of the WIN32K.sys component of the operating system.

In accordance with the present disclosure, driver 202 is connected with the local agent 120 and receives a signal indicating that a remote user is interacting with data generated on computing device 106. In particular, agent 212 of remote computing device 106 communicates with agent 120 to determine whether the remote user is interacting with a remote display of locally generated data. Local agent 120 and remote agent 212 communicate according to a thin-client or remote-display protocol as described hereinabove in connection with FIGS. 1A-1C. In one particular embodiment, remote agent 212 is a server agent transmitting data, generated by resource 208, to local agent 210 for displaying on at least one display device 124a-n of local computing device 102.

Resource 208 executes on local computing device 106 and generates output data. Remote agent 212 receives the generated output data and forwards the generated output data to local agent 120. Local agent 120 then directs a display of the received output data on the display device of local computing device 102. For example, local agent 120 may direct an operating system executing in local computing device 102, such as, for example, operating system 206, to display the received output data on at least one display device 124a-n. Resource 208 may include a program, an application, a document, a file, a plurality of applications, a plurality of files, an executable program file, a desktop environment, a computing environment, or other resource made available to a user of the computing device 102. In one of these embodiments, a computing environment may be one or more of: an application, a plurality of applications, a desktop application, and a desktop session in which one or more applications may execute. In other embodiments, a resource 208 implements an application-programming interface (API) such as the MICROSOFT DirectX or the Open Graphics Library (OpenGL) graphics APIs.

With continuing reference to FIG. 2, driver 202 creates a power management system to power down the locally attached display devices (i.e. monitors) when a remote user is connected to local computing device 106. In particular, the local agent 210 activates a filter 202a executing in driver 202, when a remote user is connected. In accordance with the present disclosure, when operating system 206 receives a signal (for example, from an input device) to activate at least one display device, operating system 206 generates and sends a request signal to display adapter 204. Filter 202a intercepts the requests and redirects the request signal to local agent 120 when a remote user is currently active. If the remote user is not currently active, or if the remote session has ended, then filter 202a directs the intercepted request to display adapter 204. However, filter 202a will send a signal to the operating system indicating that the display device has been powered on, even when the intercepted message was redirected to local agent 120. Thus, filter 202a will in effect trick operating system 206 into believing that the display device is powered on. Therefore, a user local to the local computing device 106 is unable to see what the remote user is doing on the local desktop. Even attempting to plug-in a new monitor, for example, will still fail to display the secure data since display adapter 204 never received the instructions from operating system 206. In one particular embodiment, filter 202a is activated whenever a remote session is established and is inactive when the remote session is terminated. This activating and deactivating is executing by local agent 120.

Figure 3:
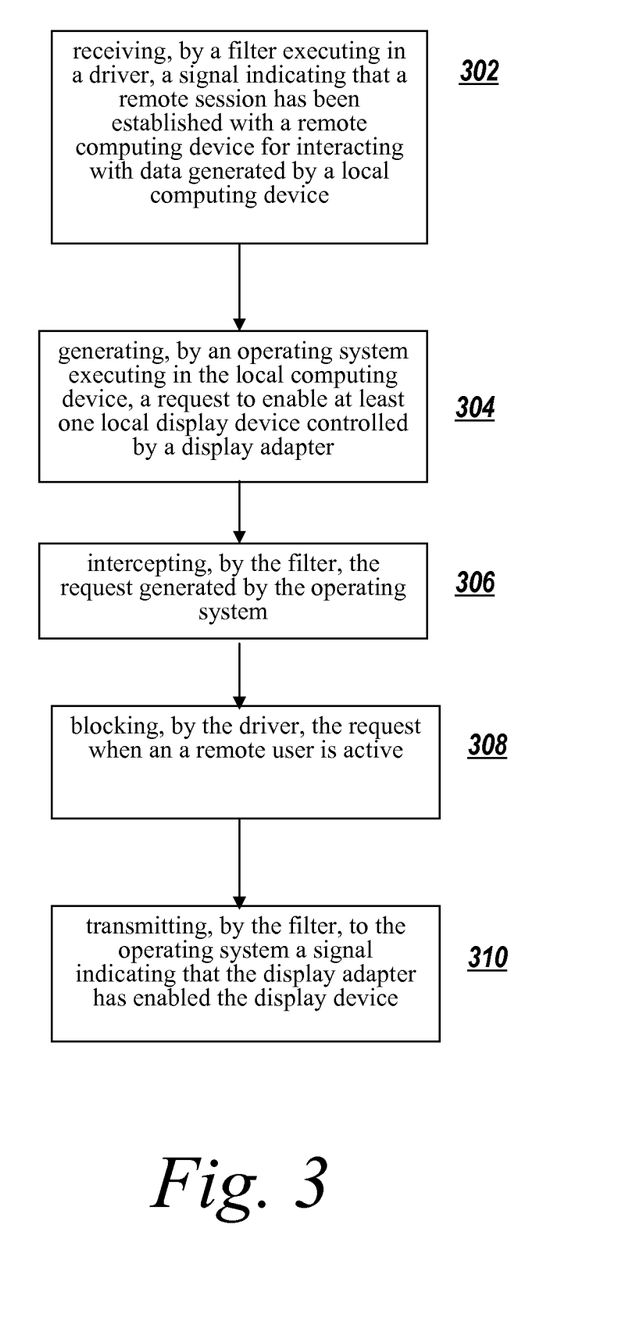
FIG. 3 is a flow diagram depicting one embodiment of a method for preventing a local computing device from displaying data generated by a remote computing device, according to one embodiment of the presently described method.

Referring now to FIG. 3, a flow diagram illustrating one embodiment of a method of filtering a request to display data generated by a remote computing device. The method includes receiving, by a filter executing in a driver, a signal indicating that a remote session has been established with a remote computing device for interacting with data generated by a local computing device (302); generating, by an operating system executing in the local computing device, a request to enable at least one local display device controlled by a display adapter (304); intercepting, by the filter, the request generated by the operating system (306); blocking, by the driver, the request when an a remote user is active (308); and transmitting, by the filter, to the operating system a signal indicating that the display adapter has enabled the display device (310).

With continued reference to FIG. 3, in conjunction with FIG. 2, driver 202, executing on a computing device 106, intercepts a request generated by operating system 26, to enable at least one of the display device 124a-n associated with the computing device 106. This request to enable at least one of the display device 124a-n is typically directed to display adapter 204. Filter 202a, which executes in driver 202, monitors the request directed to display adapter 204. In one embodiment, filter 202a of driver 202 intercepts an instruction to display adapter 204 to power on at least one of display device 124a-n. In another embodiment, filter 202a of driver 202 intercepts an instruction transmitted by a component in operating system 206 when the component determines that a user has interacted with a local input/output device, such as a keyboard or mouse. In some embodiments, the driver 202 intercepts input/output requests addressed to the display adapter 204 by monitoring communication received by a video device.

In accordance with the present disclosure, when driver 202 receives an indication that a remote user is interacting with a remote display of locally generated data (302), driver 202 then decides whether to transmit the intercepted request to enable at least one of display device 124a-n to display adapter 204 or to local agent 120. In one embodiment, the driver 202 receives the presence of a remote user from local agent 120 executing on local computing device 106. Agent 120 is in communication with an agent 210 on remote computing device 102 to determine whether the remote user is interacting with the remote display of locally generated data. Driver 202 will also receive an indication that the remote user has terminated interaction with the remote display of the locally generated data. If a user has terminated interaction with the locally generated data or driver 202 does not have indication of a remote session, the filter 202a will transmit, to display adapter 204, the intercepted request to enable the display device 124a. In one particular embodiment, upon receiving the indication that the remote user no longer interacts with the remote display of locally generated data, driver 202 makes a determination to allow the operating system 206 to direct the powering on of the display device 124a without interception by driver 202.

Alternatively, the driver determines not to transmit the intercepted request to the display adapter based upon the received indication that the remote user is interacting with the remote display. By not transmitting the intercepted request to the display adapter 204, the driver 202 prevents the display adapter 204 from powering on the display device 124a.

In one embodiment, the driver 202 determines whether the intercepted request is a request to change a power state of the display device 124a from a first power state—such as, for example, off—to a second power state—such as, for example, on. In another embodiment, the driver 202 determines whether the intercepted request includes an identification of a type of the request. In yet another embodiment, the driver 202 determines whether to prevent transmission of the request to the display adapter 204 based upon a type of the request. For example, the driver 202 determines that the request is an "IOCTL_VIDEO_SET_OUTPUT_DEVICE_POW-ER_STATE" type of request, determines that a remote user is interacting with data generated by the computing device 106, and makes a determination not to forward the request to the display adapter 204.

In another embodiment, the driver 202 determines that a remote user is interacting with data generated by the local computing device 106 and the driver 202 generates an instruction to the display adapter 204 to power down the display device 124a. Thus, upon intercepting a subsequent request from the operating system 206 to power on at least one of the display device 124a-n and confirming that the remote user continue to interact with the generated data, the driver 202 prevents the intercepted request from reaching the display adapter 204 by not forwarding the intercepted request. In other embodiments, the driver 202 determines that the remote user no longer interacts with the locally generated data, for example, by querying local agent 120, and allows the intercepted request to reach the display adapter 204 by forwarding the request.

When local computing device 106 is associated with a plurality of monitors, the driver 202 intercepts at least one request addressed to the display adapter 204 to power on each of a plurality of monitors and driver 202 prevents the display adapter 204 from powering on any of the monitors, by not forwarding the intercepted request. This is true even when the plurality of monitors each displays a subset of the output data generated by or received for display by the local computing device 106

The driver 202 transmits to operating system 206, an indication that the display adapter enabled the display device (310) regardless of whether or not the intercepted request for forwarded to display adapter 204. By transmitting the indication to the operating system 206 prevents unauthorized display of data to users of the computing device 106 while allowing the operating system 206 to execute without modification. In one particular embodiment, by responding to the intercepted request with an indication that the display adapter 204 enabled the display device 124a, the driver 202 causes the operating system 206 to operate as if the display device 124a were powered on.

Resource 208 executes substantially differently if a display device 124 is powered on than if the display device 124 is powered off. For example, resource 208 makes a determination to terminate its execution based upon a determination that at least one of display device 124a-n is disabled. Alternatively, resource 208 restarts execution based upon a determination that the display device 124 is disabled.

In one embodiment, resource 208 requests a status of at least one display device 124a-n and directs a display of output data generated by the resource 208 based upon the indication that at least one display device 124a-n is enabled. For example, resource 208 may instruct a graphics system provided by the operating system 206 to instruct the display adapter 204 to display the output data on the display device 124a.

In another embodiment, resource 208 directs a display of output data generated by the resource 208, for example, by instructing the graphics system to display the output data on at least one display device 124a-n. The graphics system instructs display adapter 204 to display the generated output data. If at least one display device 124a is disabled, then display adapter 204 responds to the instruction with an indication that the display failed. Alternatively, if at least one of display device 124a-n is enabled, then display adapter 204 responds to the instruction with an indication that the display succeeded. The graphics system forwards the received response to the resource 208. In one particular embodiment, the resource 208 may terminate or interrupt execution if the response indicates that the display of output data failed.

In one embodiment, driver 202 intercepts a request, from the resource 208, addressed to display adapter 204, for a status of at least one display device 124a-n. In another embodiment, the driver 202 intercepts a request, from the operating system 206 on behalf of the resource 208, for a status of at least one display device 124a-n. In still another embodiment, the driver 202 intercepts a request, from a graphics system executing on the computing device 106 on behalf of the resource 208, for a status of the display device 124a. In some embodiments, the driver 202 intercepts graphics commands in which the resource 208 requests information associated with a state of the display device 124a-n.

In one particular embodiment, the intercepted request is a call to a function that provides an indication of a monitor state. For example, the intercepted request is a call to a D3DKMTCheckMonitorPowerState function or a D3DKMTWaitForVerticalBlankEvent function. Alternatively, the intercepted request is a call to a D3DKMTPresent function. In another embodiment, the intercepted request is a call to a VidSchGetMonitorPowerState function or a VidSchSetMonitorPowerState function.

Driver 202 may, in some embodiments, determine that display device 124a-n is disabled and that the remote user is interacting with a remote display of the locally generated data. In these embodiments, driver 202 transmits, to the resource 208, a response to the intercepted request indicating that the display device is enabled. A second driver (not shown) intercepts the request, determines that the display device 124a is disabled and that the remote user is interacting with a remote display of the locally generated data, and transmits the response to the resource 208. In this particular embodiment, driver 202 is in communication with the second driver. In addition, driver 202 may intercept operating system 206 requests and the second driver may intercept requests from the resource 208.

In one embodiment, the resource 208 generates output data for display substantially in synchronization with a cycle on the display device 124a for refreshing data. For example, the display device 124a-n may refresh a data display periodically and the resource 208 may delay generation of new data for display until the display device 124a begins a new cycle (which may be referred to as a refresh cycle). In addition, the driver 202 intercepts a request for a status of a refresh cycle on the display device 124a. Alternatively, the driver 202 determines that the display device 124a is disabled and not refreshing a display of data or driver 202 responds to the request with an indication that the display device 124a has refreshed a display of data.

Accordingly, by preventing display adapter 204 from powering on a disabled display device 124a-n, driver 202 prevents unauthorized viewing of display data. In addition, by determining that at least one display device 124a-n of a local computing device 106 is disabled during interaction, by a remote user of a local computing device 102, with locally generated output data, and by indicating to the resource 208 generating the output data that the display device 124a-n is enabled, the driver 202 prevents unauthorized viewing of display data and prevents the resource 208 from terminating or interrupting the user interaction with the generated output data.

In some applications,

The systems and methods described above may be provided as one or more computer-readable programs embodied on or in one or more articles of manufacture. The article of manufacture may be a floppy disk, a hard disk, a CD-ROM, a flash memory card, a PROM, a RAM, a ROM, or a magnetic tape. In general, the computer-readable programs may be implemented in any programming language, LISP, PERL, C, C++, PROLOG, or any byte code language such as JAVA. The software programs may be stored on or in one or more articles of manufacture as object code.

While FIGS. 1-3 illustratively describe exemplary components and devices that can be used to practice the exemplary systems and methods, according to specific embodiments, it is clear that a person ordinarily skilled in the art can readily modify the demonstrated computing devices as well as the method steps for adaptation to application requirements consistent with the above descriptions. It should therefore be recognized that the present systems and methods are not limited to the specific embodiments illustrated hereinabove, but rather extends in utility to any other modification, variation, application, and embodiment, and accordingly, all such modifications, variations, applications, and embodiments are to be regarded as being within the scope of the presently described systems and methods.

What is claimed is:
1. A computing device comprising:
a processing unit comprising logic circuitry;
a local agent connected to a remote agent for facilitating a remote session with a remote user;
an operating system, running on the processing unit, generating a request to enable a display device controlled by a display adapter; and a filter executing in a driver and in communication with the local agent, the filter intercepting the request generated by the operating system,
wherein the filter transmits the request to the local agent when a remote user is active, and
wherein the filter transmits the request to the display adapter when said remote user is inactive.

2. The computing device of claim 1, wherein the filter transmits a signal to the operating system that the display adapter has enabled the display device when the filter transmits the request to at least one of the local agent and the display adapter.

3. The computing device of claim 1, wherein the filter transmits a signal to the operating system indicating that the display adapter has enabled the display device when the request is transmitted to the display adapter.

4. The computing device of claim 1, wherein the filter transmits the request to the display adapter when the remote session is ended.

5. The computing device of claim 1, wherein the filter transmits the request to the display adapter when the remote user is inactive.

6. The computing device of claim 1, wherein the local agent activates the filter when a remote session is facilitated.

7. A method of filtering a request to display data generated by a remote computing device, the method comprising:
receiving, by a filter executing in a driver, a signal indicating that a remote session has been established with a remote computing device for interacting with data generated by a local computing device;
generating, by an operating system executing in the local computing device, a request to enable at least one local display device controlled by a display adapter;
intercepting, by the filter, the request generated by the operating system;
blocking, by the driver, the request when a remote user is active; and
transmitting, by the filter, to the operating system a signal indicating that the display adapter has enabled the display device.

8. The method recited in claim 7, further comprising transmitting, by the filter, the request to enable the at least one local display device to the display adapter when the remote user is inactive.

9. The method recited in claim 7, further comprising transmitting, by the filter, the request to enable the at least one local display device to the display adapter when the remote session terminates.

10. The method recited in claim 7, wherein the step of receiving includes
activating, by a local agent executing in the local computing device and associated with the remote computing device, the filter when the remote session is established; wherein the local agent facilitates the remote session.

11. The method recited in claim 10, further comprising transmitting, by the filter, the request to enable the at least one display device to the local agent when the remote user active.

12. The method recited in claim 7, wherein the driver is a locally executed driver associated with the operating system and the display adapter.

13. The method recited in claim 7, wherein the request to enable is generated by at least one input device of the local computing device.

14. The method recited in claim 7, further comprising:
intercepting, by the driver, a request for a status of the at least one display device, the request originating from a resource executing on the local computing device, addressed to the display adapter;
determining, by the driver, that the at least one display device is disabled and that the remote user is interacting with locally generated data of the at least one display device; and
transmitting, by the driver, to the resource, a response to the intercepted request indicating that the at least one display is enabled.

15. The method recited in claim 7, further comprising:
intercepting, by a second driver, a request for a status of the at least one display device, the request originating from a resource executing on the local computing device, the request addressed to the display adapter;
determining, by the second driver, that the at least one display device is disabled and that the remote user is interacting with locally generated data of the at least one display device; and
transmitting, by the second driver, to the resource, a response to the intercepted request indicating that the at least one display is enabled.

16. A method for preventing a local computing device from displaying data generated by a remote computing device, the method comprising:
receiving, by a driver, a signal that a remote session has been established with the local computing device;
intercepting, by the driver executing in a local computing device, a request generated by an operating system to enable at least one display device associated with the local computing device;
transmitting, by the driver, the request generated by the operating system to a local agent, when a remote user is active; and
transmitting, by the driver, the request generated by the operating system to a display adapter when the remote user is inactive, where the display adapter is adapted for activating the at least one display device.

17. The method recited in claim 16, further comprising:
intercepting, by the driver, a request, from an application executing on the computing device, addressed to the display adapter, for a status of the display device;
determining, by the driver, that the display device is disabled and that the remote user is interacting with a remote display of the locally generated data; and
transmitting, by the driver, to the application, a response to the intercepted request indicating that the display device is enabled.

18. The method recited in claim 16, further comprising:
intercepting, by a second driver, a request from an application executing on the computing device, addressed to the display adapter, for a status of the display device;
determining, by the second driver, that the display device is disabled and that the remote user is interacting with a remote display of the locally generated data; and
transmitting, by the second driver, to the application, a response to the intercepted request indicating that the display device is enabled.

19. The method recited in claim 16, further comprising
intercepting, by the driver, a power request to the display adapter instructing said display adapter to power up the at least one display device, said power request generated by the operating system; and
preventing, by the driver, the power request from reaching the display adapter when a remote user interacts with the local computing device.

20. The method recited in claim 19, wherein the power request is generated by at least one input device.

* * * * *